(12) United States Patent
Jiang et al.

(10) Patent No.: US 11,959,839 B2
(45) Date of Patent: Apr. 16, 2024

(54) BELT-FREE FULLY-AUTOMATIC MECHANICAL TRUCK SAMPLING SYSTEM WITH IMPROVED OPERATION EFFICIENCY

(71) Applicant: LEON INTELLIGENCE & INFORMATION (SUZHOU) TECHNOLOGY CO., LTD., Jiangsu (CN)

(72) Inventors: Ying Jiang, Jiangsu (CN); Yunfei Luo, Jiangsu (CN); Guoning Jiang, Jiangsu (CN); Lu Zhou, Jiangsu (CN)

(73) Assignee: LEON INTELLIGENCE & INFORMATION (SUZHOU) TECHNOLOGY CO., LTD. (CN)

( * ) Notice: Subject to any disclaimer, the term of this patent is extended or adjusted under 35 U.S.C. 154(b) by 351 days.

(21) Appl. No.: 17/436,816

(22) PCT Filed: Aug. 20, 2019

(86) PCT No.: PCT/CN2019/101642
§ 371 (c)(1),
(2) Date: Sep. 7, 2021

(87) PCT Pub. No.: WO2020/220521
PCT Pub. Date: Nov. 5, 2020

(65) Prior Publication Data
US 2022/0260463 A1    Aug. 18, 2022

(30) Foreign Application Priority Data

Apr. 28, 2019 (CN) .......................... 201910351312.X

(51) Int. Cl.
*G01N 1/28* (2006.01)
*B02C 13/18* (2006.01)
(Continued)

(52) U.S. Cl.
CPC ............. *G01N 1/286* (2013.01); *B02C 13/18* (2013.01); *B02C 13/30* (2013.01); *G01N 1/04* (2013.01); *G01N 2001/2873* (2013.01)

(58) Field of Classification Search
None
See application file for complete search history.

(56) References Cited

FOREIGN PATENT DOCUMENTS

| CN | 2505827 Y | 8/2002 |
|---|---|---|
| CN | 2603393 Y | 2/2004 |

(Continued)

OTHER PUBLICATIONS

China National Intellectual Property Administration, The International Search Report, dated Jan. 7, 2020, for International Application No. PCT/CN2019/101642.

*Primary Examiner* — Brandi N Hopkins
*Assistant Examiner* — Nigel H Plumb
(74) *Attorney, Agent, or Firm* — Design IP

(57) ABSTRACT

A non-belt automatic mechanized sampling system for a truck configured to collect materials from a carriage of the truck. The system includes an integrated sample preparation component having, in descending arrangement, a discharging mechanism and a feeder, a crusher, a constant mass dividing machine and a sample retention barrel. The system also includes a constant mass dividing machine configured to divide the crushed material into samples and discards. The samples are conveyed to a sample retention barrel and discards to a discharging mechanism, which is configured to convey the discards to the carriage.

10 Claims, 11 Drawing Sheets

(51) Int. Cl.
*B02C 13/30* (2006.01)
*G01N 1/04* (2006.01)

(56) References Cited

FOREIGN PATENT DOCUMENTS

| | | | |
|---|---|---|---|
| CN | 103293046 A | | 9/2013 |
| CN | 103969079 A | * | 8/2014 |
| CN | 103969079 A | | 8/2014 |
| CN | 104634607 A | | 5/2015 |
| CN | 206223502 U | | 6/2017 |
| CN | 108709763 A | | 10/2018 |
| CN | 108970720 A | * | 12/2018 |
| CN | 108970720 A | | 12/2018 |
| CN | 109141994 A | | 1/2019 |
| CN | 109387396 A | | 2/2019 |
| CN | 109406192 A | | 3/2019 |
| CN | 109490042 A | | 3/2019 |
| CN | 109959526 A | * | 7/2019 |
| CN | 109959526 A | | 7/2019 |
| CN | 209894506 U | | 1/2020 |
| KR | 200453651 Y1 | | 5/2011 |
| KR | 20130087251 A | | 8/2013 |
| WO | 2016101909 A1 | | 6/2016 |

\* cited by examiner

US 11,959,839 B2

BELT-FREE FULLY-AUTOMATIC MECHANICAL TRUCK SAMPLING SYSTEM WITH IMPROVED OPERATION EFFICIENCY

The application is a U.S. National Stage Application of PCT Application Serial No. PCT/CN2019/101642, filed Aug. 20, 2019, which claims priority to Chinese patent application No. 201910351312. X filed Apr. 28, 2019, the disclosures of which are incorporated herein by reference in their entirety.

TECHNICAL FIELD

This application relates to the technical field of bulk material quality inspection, such as a non-belt automatic mechanized sampling system for a truck.

BACKGROUND

As a mechanical device, the mechanized sampler can obtain a sample from a batch of materials, the test result of the sample can represent the whole materials. There are many kinds of samplers, different industries and places adopt different structural forms of samplers. Power plants, mines, wharves and gathering stations usually transport large quantities of minerals by truck. The mechanized sampling system for truck is one of the bulk mineral transportation systems, which is set up to sample solid minerals transported by automobile. The system is integrated with sampling, crushing, dividing, aggregating and discarding. It is widely used in the field of road transportation of solid minerals such as coal, coke and steel because of its reasonable structure, reliable and convenient operation. It can complete the sample collection and primary sample preparation of bulk solid mineral materials transported by road when entering or leaving the factory, which can provide representative samples that meet the weight specified in the corresponding national standard for the next laboratory sample preparation. Therefore, the representativeness of sampling samples is the core index to determine the performance of the mechanized sampling system for truck.

SUMMARY

The application provides a non-belt automatic mechanized sampling system for truck, which can solve the problem of manual handling of discarded materials by the scraping divider in the related technology.

The application provides a non-belt automatic mechanized sampling system for truck. The system includes: a working platform including a transport channel and a slide rail extending along the first direction, the transport channel is arranged under the slide rail and is configured to make the truck pass; a first frame, which is arranged to slide with the slide rail; first horizontal driving mechanism, which is connected with the first frame and configured to drive the first frame to slide along the first direction; a sampling mechanism, which is configured to slide along the second direction relative to the first frame, the sampling mechanism is also configured to collect materials from the truck, the first direction is perpendicular to the second direction, the first and second directions are arranged horizontally; an integrated sample preparation component, which includes a discharging mechanism and a feeder, a crusher, a constant mass dividing machine and a sample retention barrel arranged from top to bottom. The feeder is configured to transport the material to the crusher. The crusher is configured to crush the material and transport the crushed material to the constant mass dividing machine. The constant mass dividing machine is configured to divide the crushed material into samples to the sample retention barrel, and the discarded material to the discharging mechanism. The discharging mechanism is configured to transport the discarded materials to the carriage.

Figure 1:
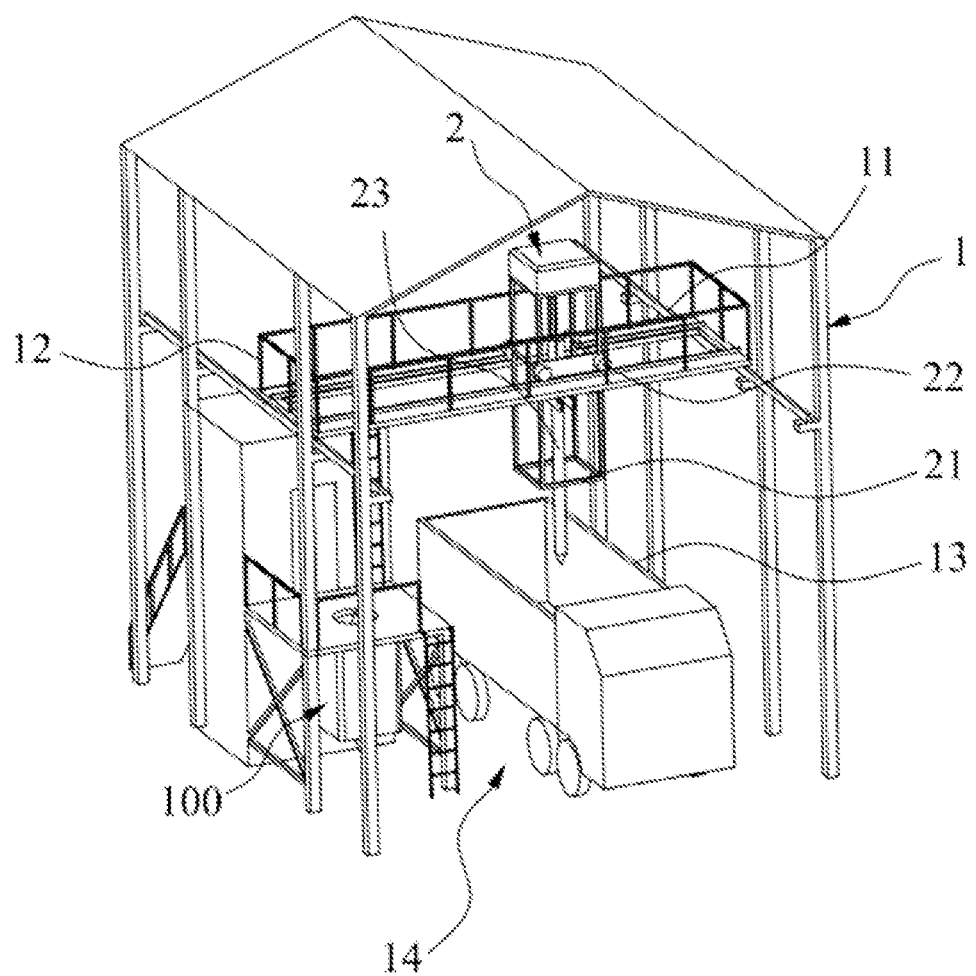
FIG. 1 is the structural diagram of the non-belt automatic mechanized sampling system for the truck in the embodiment of the application.

1—working platform; 11—slide rail; 12—first frame; 13—carriage; 14—transport channel; 15—first horizontal driving mechanism; 151—driving motor; 152—driving wheel; 153—horizontal driving wheel;

2—sampling mechanism; 21—second frame; 22—walking wheel; 23—sampler; 231—screw; 232—barrel; 233—rotary drive; 234—sampling head; 24—vertical driving mechanism; 241—first electric motor; 242—first active wheel; 243—first rack; 25—second horizontal driving mechanism; 251—second electric motor; 252—second active wheel; 2531—first fixed plate; 2532—second fixed plate; 2541—first connecting shaft; 2542—second connecting shaft;

100—integrated sample preparation component; 3—feeder; 4—crusher; 5—constant mass dividing machine;

31—stock bin; 311—sidewall; 3111—cavity; 3112—first inlet; 312—floor; 3121—first outlet;

32—first rotating bearing; 33—feeding component; 34—discharge channel; 35—first driving device; 351—third electric motor; 352—first driven wheel; 353—second driven wheel;

41—shell; 411—second inlet; 412—second outlet; 413—crushing chamber; 42—second rotating bearing; 43—crushing mechanism; 431—hammer plate; 432—hammer; 44—first chute; 45—second driving device; 451—fourth electric motor; 452—third active wheel; 453—second driven wheel; 454—chain;

51—box; 511—dividing cavity; 512—third inlet; 513—discharge port;

52—third driving device; 521—fifth electric motor; 522—transmission component;

53—sample retention channel; 54—discharging channel; 55—dividing part; 551—window;

6—discharging mechanism; 61—horizontal transmission agency; 611—outer shell; 612—sixth electric motor; 62—multi bucket elevator; 621—cover; 63—rotary discharger; 631—rotary chute; 632—fifth driving device;

7—sample retention barrel;

81—turntable; 82—rotary driving device; 83—lifting mechanism;

9—spare chute.

DETAILED DESCRIPTION

In the description of the application, it should be noted that the orientation or position relationship indicated by the terms "center", "up", "down", "left", "right", "vertical", "horizontal", "inside" and "outside" is based on the orientation or position relationship shown in the drawings. Which is only for the convenience of describing the application and simplifying the description, rather than indicating or implying the device or element referred to must have a specific orientation, constructed and operated in a specific orientation. It cannot be understood as a limitation of the application. In addition, the terms "first" and "second" are used only for descriptive purposes and cannot be understood to indicate or imply relative importance. Among them, the terms "first position" and "second position" are two different positions.

In the description of the application, it should be noted that the terms "install", "link" and "connect" should be understood broadly unless otherwise specified and limited. For example, they can be fixed connection, detachable connection or integrated connection; mechanical connection or electrical connection; direct connection or indirect connection through intermediate media, or internal connection between two components. For ordinary technicians in this field, the specific meaning of the above terms in the application can be understood in specific circumstances.

From the perspective of function division, the mechanized sampling system for truck is mainly divided into sampling mechanism and sample processing mechanism. The main function of the sampling mechanism is to collect samples of predetermined weight at the specified level and depth of the carriage according to the setting of the automatic control program. The main function of the sample processing mechanism is to crush and divide the samples collected by the sampling mechanism according to the requirements of the national standard. And to prepare the retained samples with preset particle size and weight for laboratory use. Meanwhile to pass the remaining samples to return to the specified location through pre-set mode.

The sampling mechanism includes drilling sampling head and moving and lifting device of sampling head. The sample processing mechanism includes crusher, dividing belt conveyor and scraper divider. The crusher mostly adopts horizontal crusher with sieve plate. First the sample is extracted by the drilling sampler, then it falls into the receiving hopper of feeder, transported by closed feeding belt conveyor into the crusher (the crusher is usually located in the middle of the closed feeding belt conveyor) and the crushing of the sample is completed by the crusher. The crushed sample enters the dividing belt conveyor. The conveyor carries out the primary dividing at the same time of transportation. The scraper divider is used to divide and reserve the crushed samples again. The excess sample continues to be transported to the residual material treatment system through the belt conveyor, and then returned to the carriage or directly discharged back to the mine by the treatment system. All materials are driven by belt in the whole sample preparation process.

Taking coal or coke as an example, the following problems still exist in the actual use of the mechanical sampling system for truck in related technology:

1) In the process of sample preparation, it is usually necessary to collect multiple increments. But if the feeder of mechanized sampling system in related technology gathers multiple increments, especially when the material moisture is large, it is easy to cause material bulking, which affects the subsequent sample collection accuracy.
2) In the horizontal crushing mode with sieve plate, the mesh of sieve plate is easy to block after long-time use, which affects the subsequent sample preparation accuracy.
3) It is easy to cause residue and mixing in different batches of samples by using belt as material conveying mode.
4) The horizontal crushing method with sieve plate can screen out the materials whose particle size is larger than the mesh of the sieve, which affects the representativeness of the subsequent samples to a certain extent.
5) In the process of dividing, the material above the upper surface height of the belt is scraped off by scraper, only the material below is retained. However, this dividing way easily leads to uneven dividing, resulting in large bias of the whole system.

6) All the materials are driven by belt in the whole process of sample preparation, the transportation distance is long and the moisture loss is large.
7) In the related technology, the samples after the dividing of the scraper are usually collected in the sample retention barrel, but the waste materials are usually piled up next to the scraper. When there are more wastes, it will be manually transported to other places.

As shown in FIG. 1-FIG. 18, this embodiment provides a non-belt automatic mechanized sampling system for truck, which includes a working platform 1, a first frame 12, a first horizontal driving mechanism 15, a sampling mechanism 2 and an integrated sample preparation component 100.

The working platform 1 is a steel truss structure. In this embodiment, the transport channel 14 is set under the working platform 1 to allow the truck to pass through. The slide rail 11 is set on the working platform 1 and located above the transport channel 14. The slide rail 11 extends along the first direction. The first frame 12 is sliding on the slide rail 11 and can be driven to slide along the slide rail 11 through the first horizontal driving mechanism 15.

The sampling mechanism 2 is set to collect materials from the carriage 13 and the sampling mechanism 2 can slide in the second direction relative to the first frame 12. The second direction is perpendicular to the first direction and both of them are arranged horizontally. In the embodiment, the sampling mechanism 2 includes a second frame 21, a walking wheel 22, a sampler 23, a second horizontal driving mechanism 25 and a vertical driving mechanism 24. The walking wheel 22 is rotated on the second frame 21 and slidably arranged on the first frame 12. The sampler 23 slides on the second frame 21 and the sampler 23 is set to collect materials from the carriage 13. The second horizontal driving mechanism 25 can drive the second frame 21 to slide in the second direction relative to the first frame 12. The vertical driving mechanism 24 can drive the sampler 23 to move in the vertical direction and the sampler 23 can collect materials from the carriage 13. In the embodiment, the sampler 23 can collect materials in three directions perpendicular to each other and the collection range of the sampler 23 covers the whole carriage 13 by setting the second horizontal driving mechanism 25 and the vertical driving mechanism 24, cooperating with the first horizontal driving mechanism 15.

Figure 6:
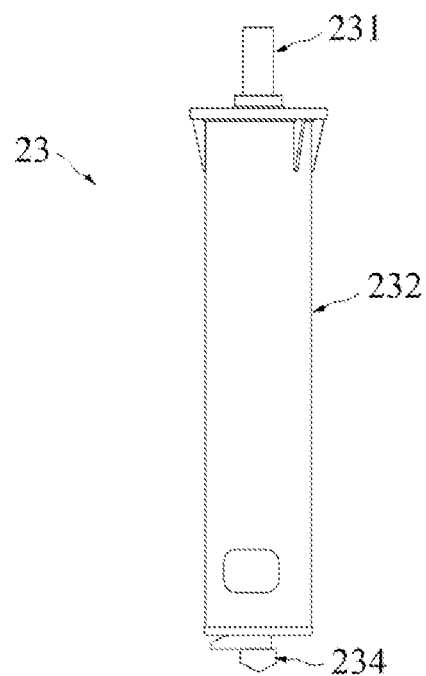
FIG. 6 is the structural diagram of the sampler in the non-belt automatic mechanized sampling system for the truck in the embodiment of the application.
Figure 7:
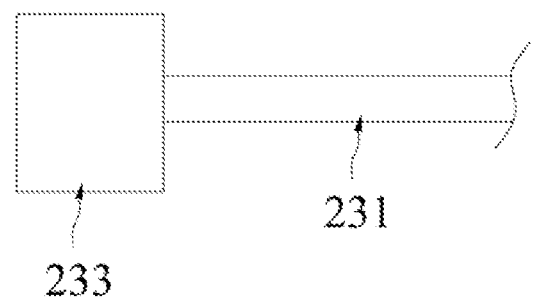
FIG. 7 is the structural diagram of the connection between the rotating driving part and the screw in the sampler of the non-belt automatic mechanized sampling system for the truck in the embodiment of the application.

As shown in FIG. 6 and FIG. 7, the sampler 23 includes a barrel 232, a rotary drive 233, a sampling head 234 and a screw 231. The barrel 232 is slidingly arranged on the second frame 21. The vertical driving mechanism 24 is connected with the barrel 232 and the vertical driving mechanism 24 can drive the barrel 232 to move in the vertical direction. The rotary drive 233 is fixed connected with the barrel 232. The sampling head 234 is installed at the bottom of the barrel 232. The sampling head 234 is conical so that the sampler 23 can be smoothly inserted into the material when sampling. The screw 231 is penetrated into the barrel 232 and bottom of the screw 231 is close to the sampling head 234. In the embodiment, the rotary drive 233 is an electric motor. In other embodiments, the rotary drive 233 may also be a hydraulic motor. The screw 231 is driven to rotate by the rotary drive 233 and the screw 231 gradually extrudes the material into the barrel 232 while rotating.

Figure 8:
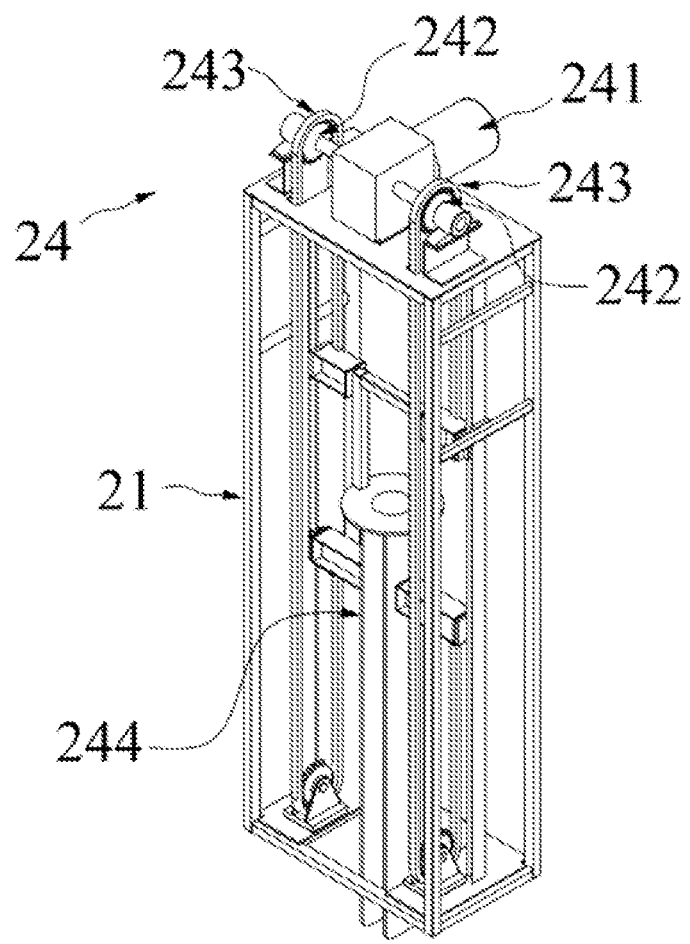
FIG. 8 is the structural diagram of the vertical driving mechanism in the non-belt automatic mechanized sampling system for the truck in the embodiment of the application.

As shown in FIG. 8, in this embodiment, the vertical driving mechanism 24 includes a first electric motor 241, a first active wheel 242 connected with the output shaft of the first electric motor 241, a first rack 243 engaged with the first active wheel 242 and a sampling head hanger 244. The first rack 243 is fixedly connected with the sampling head hanger 244. The barrel 232 is connected with the sampling head hanger 244. The first electric motor 241 is fixedly installed on the second frame 21 and the first active wheel 242 is rotationally installed on the second frame 21. When the first electric motor 241 rotates, the sampling head hanger 244 is driven to rise and fall along the vertical direction through the first rack 243, thereby the barrel 232 and the rotary drive 233 fixed on the barrel 232 rise and fall along the vertical direction. In the embodiment, the sampling head hanger 244 is set to ensure that the direction of the barrel 232 is stable during lifting.

Figure 9:
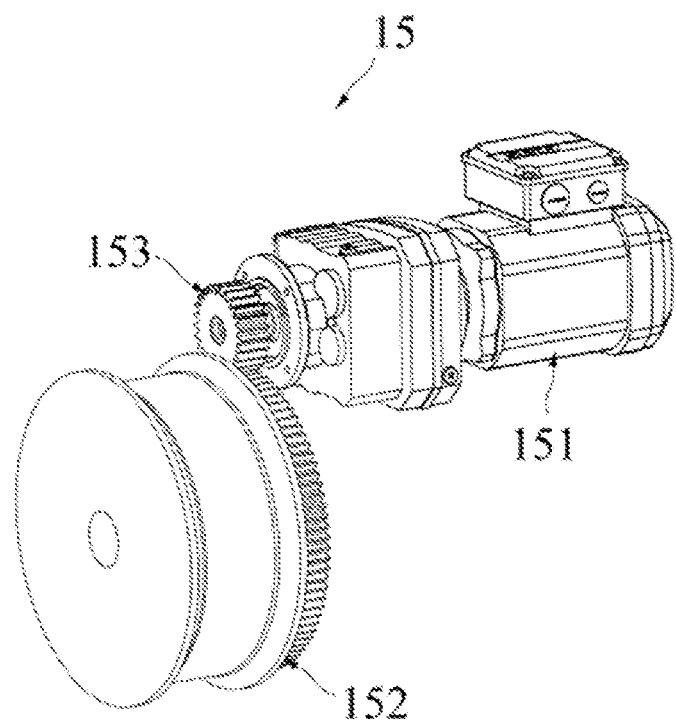
FIG. 9 is the structural diagram of the first horizontal driving mechanism in the non-belt automatic mechanized sampling system for the truck in the embodiment of the application.

As shown in FIG. 9, the first horizontal driving mechanism 15 includes a driving motor 151, driving wheel 152 and a horizontal driving wheel 153. Among them, the driving motor 151 is fixedly connected to the first frame 12. The horizontal driving wheel 153 is connected with the output shaft of the driving motor 151 and the horizontal driving wheel 153 is meshed with the driving wheel 152. The driving wheel 152 is slidingly arranged on the slide rail 11 and the driving wheel 152 is rotationally connected to the first frame 12. The driving motor 151 can drive the horizontal driving wheel 153 to rotate, thus driving the driving wheel 152 to move the first frame 12 along the slide rail 11. In the embodiment, two slide rails 11 are arranged on the working platform 1 in intervals and parallel. Correspondingly, the first frame 12 is provided with two first horizontal driving mechanisms 15 at both ends along the second direction. The driving motor 151 needs to ensure that the first frame 12 can also move normally along the headwind direction when the wind speed is very large.

Figure 10:
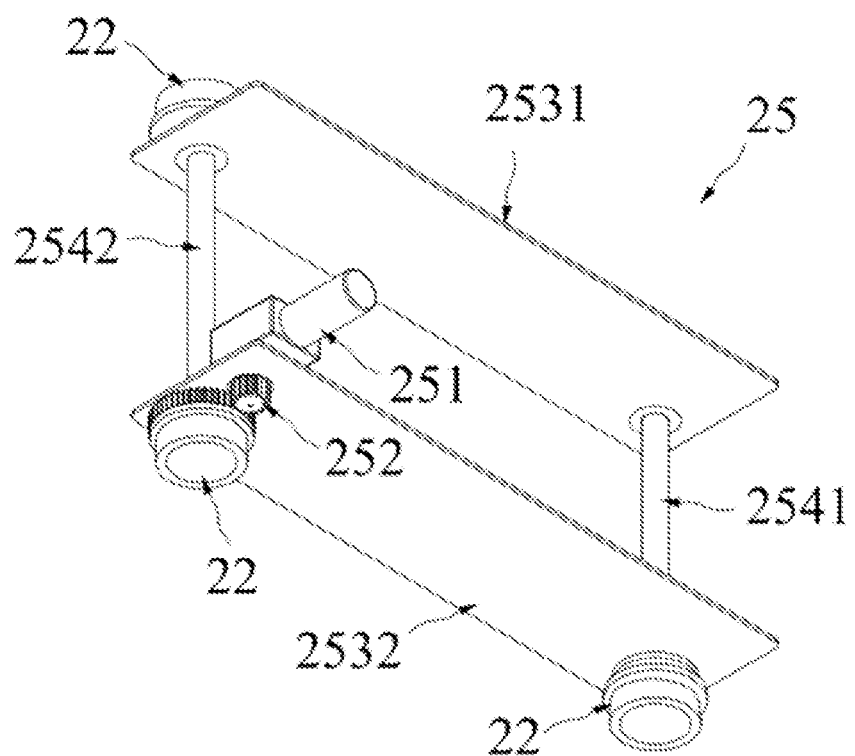
FIG. 10 is the structural diagram of the second horizontal driving mechanism in the non-belt automatic mechanized sampling system for the truck in the embodiment of the application.

The second horizontal driving mechanism includes a second electric motor, a second active wheel connected to the output shaft of the second electric motor, a first driven wheel spaced with the second active wheel in the second direction and belt mounted on the second active wheel and the first driven wheel. The second active wheel and the first driven wheel are rotatably arranged on the first frame 12. The second electric motor is also mounted on the first frame 12. The belt extends in the second direction and is fixed to the second frame 21. When the second electric motor turns, the sampler 23 moves in the second direction relative to the first frame 12 by belt. As shown in FIG. 10, in the embodiment, the second horizontal driving mechanism 25 includes a second electric motor 251, a first fixed plate 2531, a second fixed plate 2532, a first connecting shaft 2541, a second connecting shaft 2542 and a second active wheel 252 connected to the output shaft of the second electric motor 251. Among them, the first fixed plate 2531 is arranged parallel to the second fixed plate 2532, and the second electric motor 251 is fixed to the second fixing plate 2532. The output shaft of the second electric motor 251 is connected with the second active wheel 252 after piercing the second fixed plate 2532. The first connecting shaft 2541 is vertically connected between the first fixed plate 2531 and the second fixed plate 2532. After passing through the first fixed plate 2531 and the second fixed plate 2532 at both ends of the first connecting shaft 2541, a walking wheel 22 is connected to each other. The installation of the second connecting shaft 2542 is the same as that of the first connecting shaft, that is, four walking wheels 22 are provided in this embodiment. The walking wheel 22 connected with the second connecting shaft 2542 through the end of the second fixed plate 2532 is meshed with the second active wheel 252. When the second electric motor 251 rotates, it drives the second active wheel 252 to rotate, the second active wheel 252 drives the second connecting shaft 2542 and the walking wheel 22 at both ends of the second connecting shaft 2542 to rotate at the same time, so as to drive the first connecting shaft 2541 and the walking wheel 22 at both ends of the first connecting shaft 2541 to rotate. Thus, four walking wheels 22 slide in the second direction simultaneously and to drive the sampler 23 to move in the second direction.

The opening size of sampling head 234 is determined by the maximum nominal particle size of the collected material, and the opening size of the sampling head 234 is usually three times and more than three times of the maximum nominal particle size. In the embodiment, the sampling mechanism 2 is suitable for carriage 13 which is 1.25 m above the ground. In order to prevent the failure of the first electric motor 241, the first active wheel 242 is equipped with a handle, which is away from the center of the first active wheel 242. Therefore, when the sampling head 234 dives to the carriage 13, the first electric motor 241 fails and the sampling head 234 cannot be lifted automatically, the handle can be manually turned to drive the sampling head 234 to lift, which does not affect the normal traffic of the truck.

The integrated sample preparation component 100 is located on the side of the first frame 12. It includes a feeder 3, a crusher 4, a constant mass dividing machine 5 and a sample retention barrel 7 driven from top to bottom. The feeder 3 is arranged to transport the material evenly and continuously to the crusher 4. The crusher 4 is arranged to crush the material and transport the material after crushing to the constant mass dividing machine 5. The constant mass dividing machine 5 is set to divide the crushed material into constant mass fractions. That is, the constant mass dividing machine 5 can divide the material into samples and discards. The constant mass dividing machine 5 transports the samples to the sample retention barrel 7, then the samples can be retained. The discards are transported to the discharging mechanism 6. The discards are transported to the storage place through the discharging mechanism 6.

In the embodiment, the feeder 3 includes a stock bin 31, a first rotating bearing 32, a first driving device 35 and a feeding component 35. The inner part of the stock bin 31 is provided with cavity 35. The upper and lower ends of the cavity 35 are provided with first inlet 3112 and first outlet 3121 respectively. Sampling mechanism 2 can transport material to the stock bin 31. The first rotating bearing 32 is arranged at the first outlet 3121. The first end of the feeding component 35 is fixed to the first rotating bearing 32 and the second end is fitted to the inner wall of the stock bin 31. The second end of the feeding component 35 can slide relative to the inner wall of the stock bin 31. In the embodiment, a gap can also be arranged between the second end of the feeding component 35 and the inner wall of the stock bin 31. The feeding component 35 is located at the bottom of the cavity 35. The first driving device 35 is arranged to drive the first rotating bearing 32 to rotate, so that the first rotating bearing 32 drives the feeding component 35 to rotate. When the feeding component 35 rotates, the material can be driven to move to the first outlet 3121. In the embodiment, the axis of the first outlet 3121 coincides with the axis of the first rotating bearing 32. When the feeding component 35 rotates, the material in contact with the feeding component 35 can be scraped from the inner wall of the stock bin 31 to the direction of the first outlet 3121. The material can flow out from the first outlet 3121, which ensures that the material in the stock bin 31 will not accumulate and the uniformity of the discharge. With the continuous rotation of the feeding component 35, the material in the stock bin 31 will be reduced layer by layer, which can ensure the continuity and stability of the discharge. So as to ensure that there is no material accumulation and plugging in the subsequent sample preparation process and ensure the representativeness of the prepared samples.

The feeder 3 also includes a first blowing device, and the first blowing device is connected with the external high-pressure gas source through the pipeline. The first blowing device is arranged to clean the material left in the inner wall of the cavity 35 and the residual material on the surface of the feeding component 35, so as to prevent material from remaining on the surface of cavity 35 after material treatment. It can effectively improve the working environment, reduce the labor load of the operator and improve the working efficiency. Solenoid valve or manual control valve can be set on the pipeline, so the first blowing device can start and stop by manual control or by controller.

The stock bin 31 includes an annular sidewall 311 and a floor 312 connected with the bottom of the sidewall 311. The opening at the top of the sidewall 311 forms the first inlet 3112 and the first outlet 3121 is arranged on the floor 312.

Figure 11:
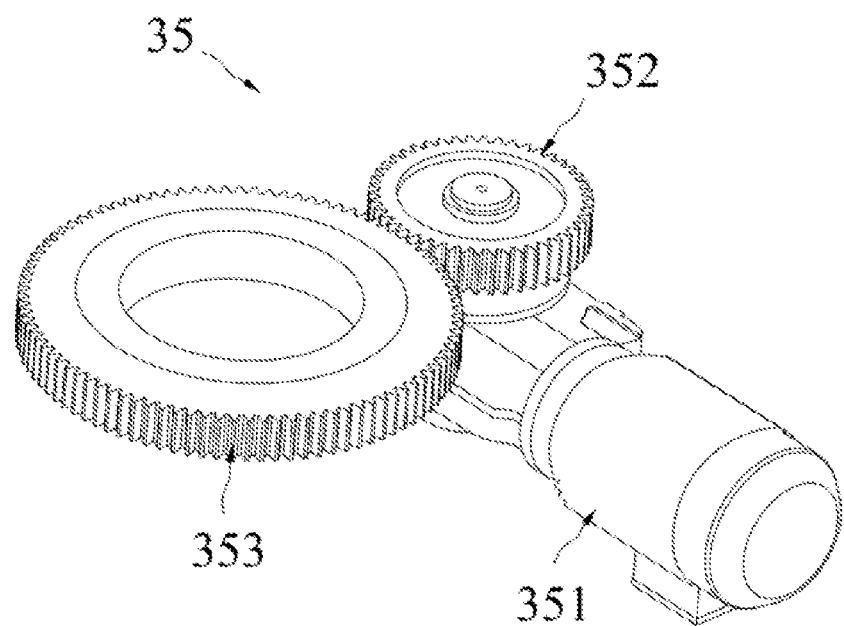
FIG. 11 is the structural diagram of the first driving device in the non-belt automatic mechanized sampling system for the truck in the embodiment of the application.

As shown in FIG. 11, the first driving device 35 includes a third electric motor 351 and a transmission component. The third electric motor 351 is connected with the first rotating bearing 32 through the transmission component and drives the first rotating bearing 32 to rotate. The transmission component includes first driven wheel 352 and second driven wheel 353 meshing with the first driven wheel 352. The first driven wheel 352 is connected with the output shaft of the third electric motor 351. The second driven wheel 353 is connected with the first rotating bearing 32. In the embodiment, the rotation speed of the feeding component 35 is controlled by controlling the rotation speed of the third electric motor 351 to realize the control of the falling speed of the material.

Figure 2:
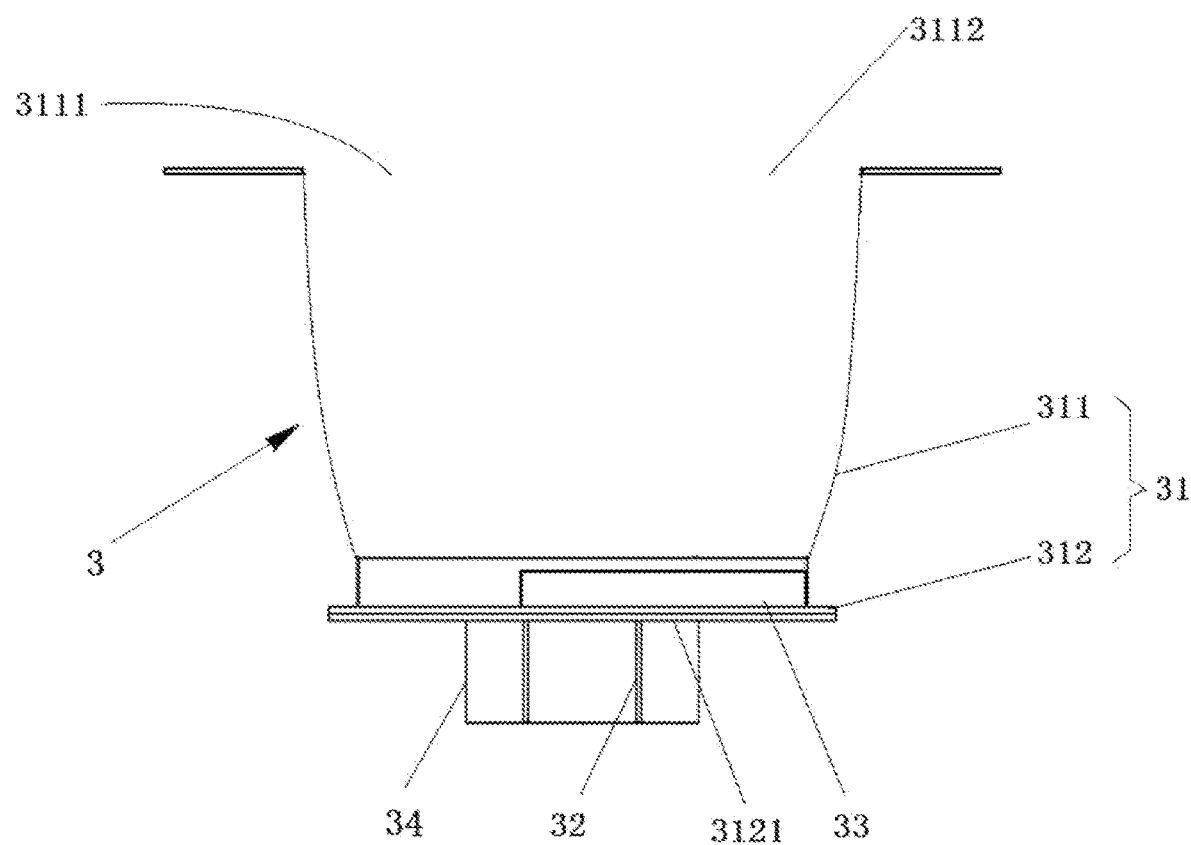
FIG. 2 is the structural diagram of the feeder in the non-belt automatic mechanized sampling system for the truck in the embodiment of the application.
Figure 3:
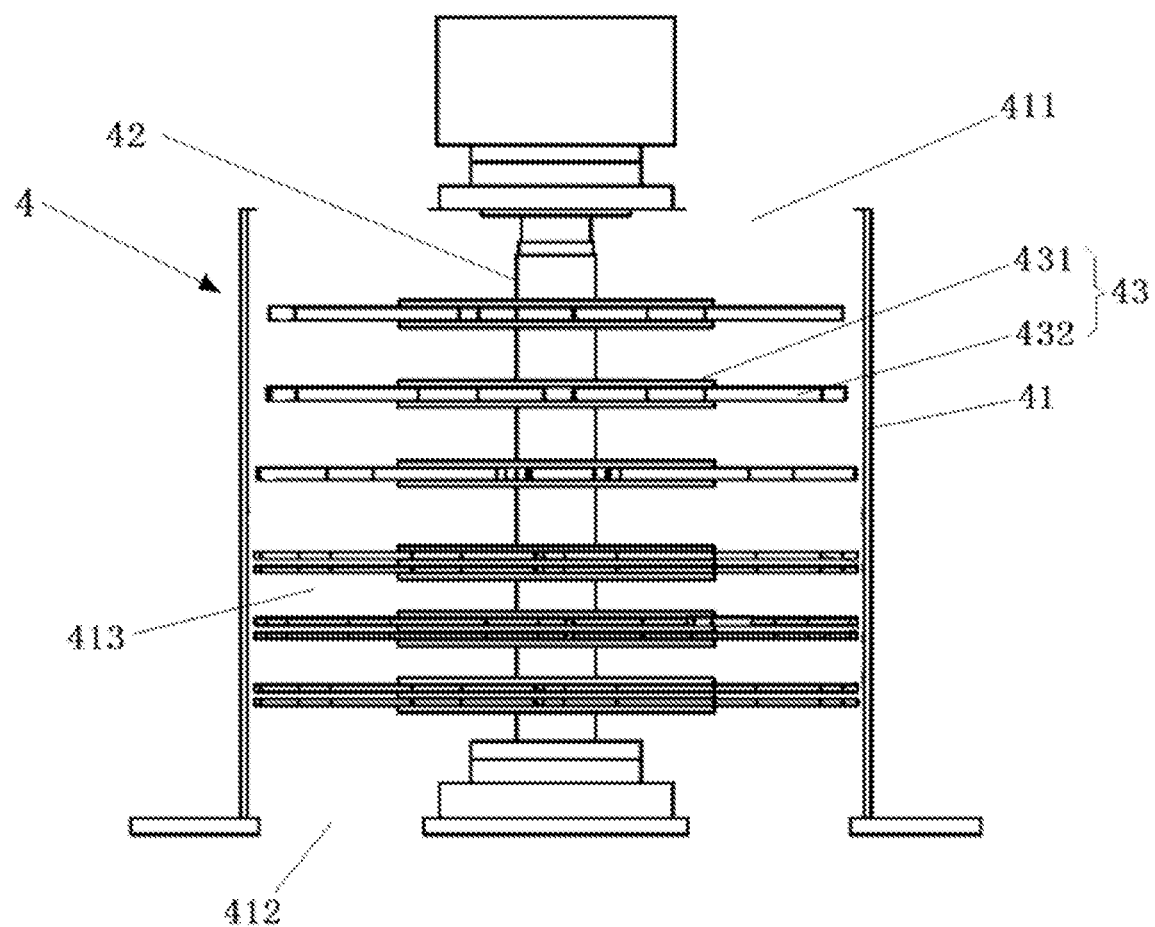
FIG. 3 is the structural diagram of the crusher in the non-belt automatic mechanized sampling system for the truck in the embodiment of the application.
Figure 12:
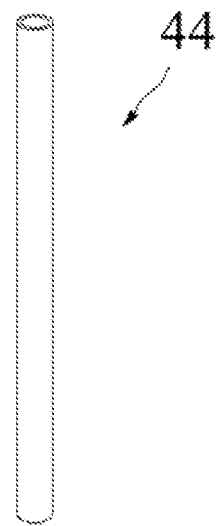
FIG. 12 is the structural diagram of the first chute in the non-belt automatic mechanized sampling system for the truck in the embodiment of the application.

In the embodiment, the feeder 3 can supply materials to crusher 4 through first chute 44. The structure of the first chute 44 is shown in FIG. 12. In other embodiments, the first chute 44 can also be a downspouting, so that the feeder 3 can supply materials to crusher 4 through the downspouting. In the embodiment, the feeder 3 can also supply materials through discharge channel 34. As shown in FIG. 2, the top of the discharge channel 34 is connected to the floor 312 and to the first outlet 3121. The discharge channel 34 is arranged outside the first rotating bearing 32 and it extends in the vertical direction or set at a non-zero angle with the vertical direction. The material flowing out of the first outlet 3121 is introduced into the crusher 4 through the discharge channel 34. By setting the discharge channel 34, the material can slide down to the crusher 4 by self-weight. The structure is simple and the material transmission is faster. It can effectively prevent the material from being exposed to the air for a long time, resulting in water loss and affecting the representativeness of the sample. The inner surface of the discharge channel 34 should be as smooth as possible, so that the material flows smoothly and not easy to adhere. it is easy to clean.

The crusher 4 includes a shell 41, a crushing mechanism 43 and a second driving device 45. The inner part of the shell 41 is provided with a crushing chamber 413. The upper and lower ends of the crushing chamber 413 are respectively provided with second inlet 411 and second outlet 412. The second inlet 411 is connected with the feeder 3 through the discharge channel 34. The second outlet 412 is connected with the constant mass dividing machine 5 through second chute. The second chute has the same structure as the first chute 44. In other embodiments, the second chute may also be a downspouting. The second outlet 412 is connected with the constant mass dividing machine 5 through the downspouting. At least two crushing mechanisms 43 are arranged at intervals along the vertical direction. There is a gap between the crushing mechanism 43 and the inner wall of the crushing chamber 413, and the size of the gap can be adjusted. The second driving device 45 is arranged to drive the crushing mechanism 43 to rotate. Driven by the second driving device 45, the crushing mechanism 43 turns. The material falls down along the gap between the inner wall of the crushing mechanism 43 and the crushing chamber 413. For materials with larger particle size than the gap, it is crushed under the extrusion of the crushing mechanism 43 and the inner wall of the crushing chamber 413.

A Feeder 3, a crusher 4 and a constant mass dividing machine 5 are connected by a chute or a downspouting, which can effectively improve the transmission efficiency of materials between devices, effectively prevent the material moisture loss and ensure the representativeness of the samples prepared.

The crusher 4 also includes a second rotating bearing 42 partially located in the crushing chamber 413. The second driving device 45 is arranged to drive the second rotating bearing 42 to rotate. The crushing mechanism 43 includes a hammer plate 431 fixed on the second rotating bearing 42 and a plurality of hammers 432 evenly distributed on the hammer plate 431. The rotation axis of the hammer plate 431 coincides with the axis of the second rotating bearing 42. The distance between the hammer 432 and the inner wall of the crushing chamber 413 is adjustable. For materials with larger particle size than the gap, it is crushed under the extrusion of the inner wall of the hammer 432 and the crushing chamber 413.

Figure 13:
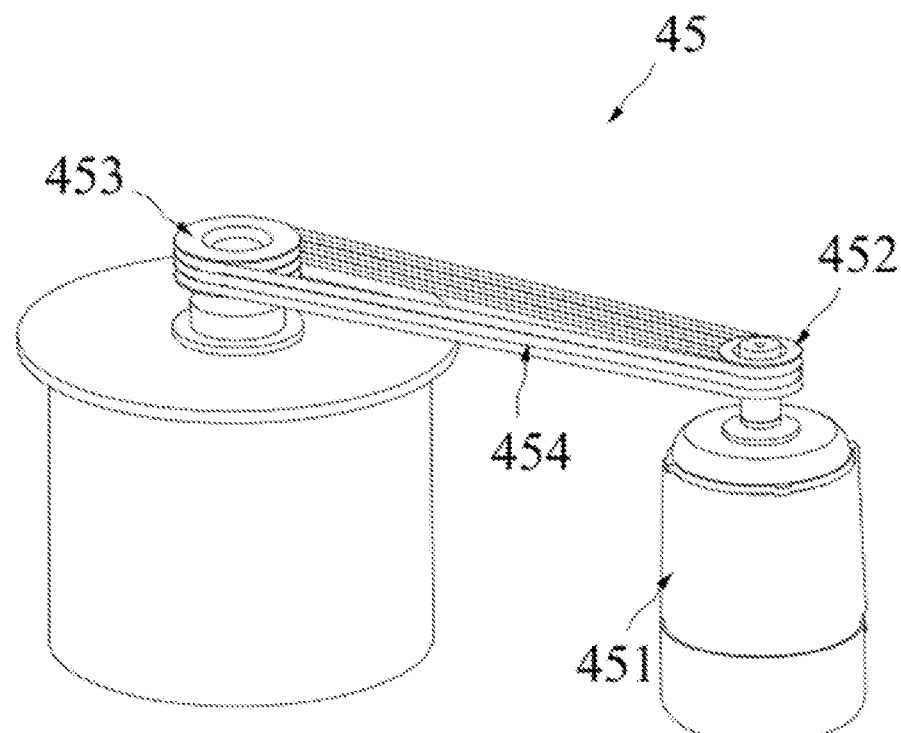
FIG. 13 is the structural diagram of the second driving device in the non-belt automatic mechanized sampling system for the truck in the embodiment of the application.

As shown in FIG. 13, the second driving device 45 includes a fourth electric motor 451, a third active wheel 452 fixed to the output shaft of the electric motor 451, a second driven wheel 453 fixed to the top of the second rotating bearing 42, and a chain 454 connecting the third active wheel 452 and the second driven wheel 453. In other embodiments, the chain 454 may also be replaced with a belt.

The crusher 4 also includes a second blowing device which is arranged on the shell 41 and connected with the external high pressure gas source through the pipeline. It can be set to blow the residual material in the crushing chamber 413. Solenoid valve or manual valve can be set on the pipeline to control the start and stop of the second blowing device. Through the second blowing device, the residual material on the inner wall of the crushing chamber 413 and the surface of the crushing mechanism 43 can be swept clean, which can avoid the mixing of different batches of materials, effectively improve the working environment, reduce the labor load of operators and improve the operation efficiency.

The crusher 4 crushes the material through a plurality of crushing mechanisms 43 arranged from top to bottom. By adjusting the gap between the crushing mechanism 43 and the inner wall of the crushing chamber 413, samples of different particle sizes can be made without sieve plate. By setting the second blowing device on the inner wall of the shell 41, it can automatically clean the residual material on the inner wall of the crushing chamber 413 and the surface of the crushing mechanism 43. It reduces the labor intensity of operators and improves the cleaning efficiency.

Figure 4:
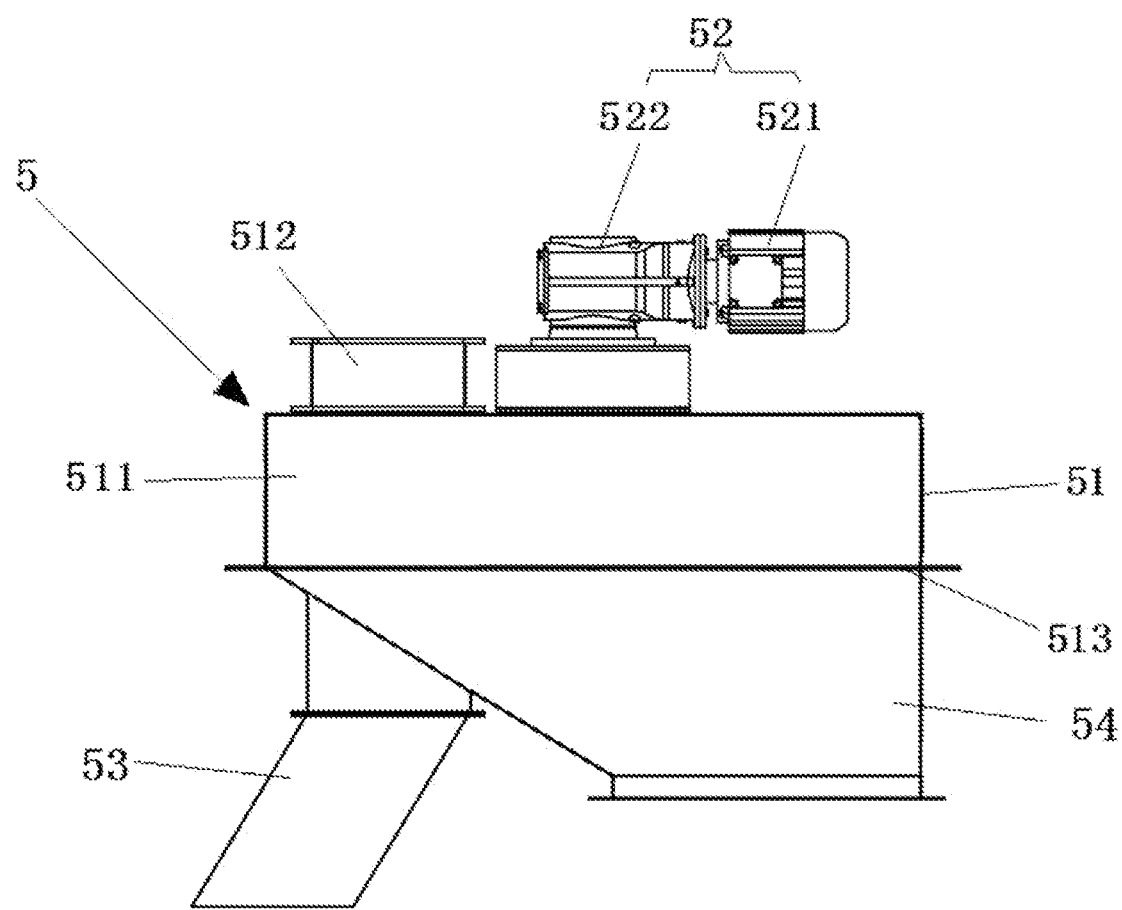
FIG. 4 is the structural diagram of the constant mass dividing machine in the non-belt automatic mechanized sampling system for the truck in the embodiment of the application.
Figure 14:
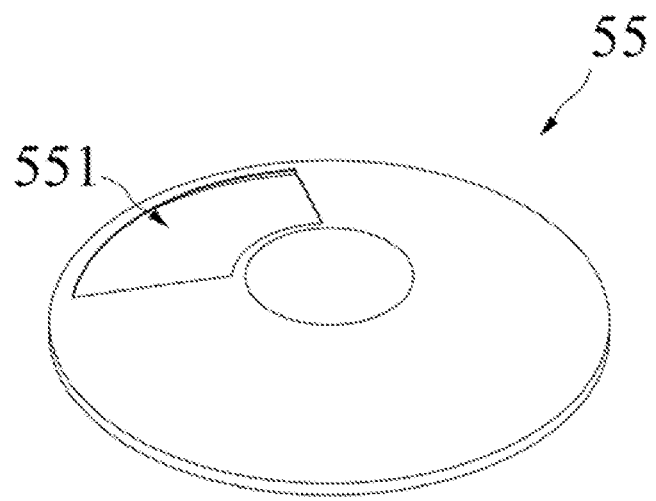
FIG. 14 is the structural diagram of the dividing part in the non-belt automatic mechanized sampling system for the truck in the embodiment of the application.

As shown in FIG. 4 and FIG. 14, the fixed constant mass dividing machine 5 includes a box 51, a third driving device 52, a dividing part 55 and a sample retention channel 53. The box 51 is provided with a dividing cavity 511, the top and bottom of the box 51 are respectively provided with a third inlet 512 and a discharge port 513 connected with the dividing cavity 511. The third inlet 512 is connected with the crusher 4. The third driving device 52 is installed on the box 51. The dividing part 55 is located in the dividing cavity 511, and is arranged to divide the material. There is a gap between the inner wall of the dividing part 55 and the dividing cavity 511. The third driving device 52 is fixed to the dividing part 55 and the dividing part 55 is provided with a window 551. The dividing part 55 has the first position that enables the window 551 to completely overlap with the third inlet 512 in the vertical direction and the second position that enables the window 551 to completely not overlap with the third inlet 512 in the vertical direction. The third driving device 52 drives the dividing part 55 to rotate between the first position and the second position. In the embodiment, the third driving device 52 can drive the dividing part 55 to rotate continuously in the same direction. The top of the dividing part 55 is connected to the third driving device 52 and the bottom is close to the bottom of the box 51. The top of the sample retention channel 53 is provided with an opening, which is located in the dividing cavity 511 and directly below the third inlet 512. The sample retention channel 53 is connected with the sample retention barrel 7. The divided sample flows into the sample retention barrel 7 through the sample retention channel 53.

The fixed constant mass dividing machine 5 also includes a discharging channel 54, the top of which is connected with the discharge port 513. The sample retention channel 53 is threaded through the discarding channel 54. The end of the discarding channel 54 is connected with the discharging mechanism 6.

In the embodiment, the material crushed by the crusher 4 enters into the dividing cavity 511 from the third inlet 512 through the second chute. The dividing part 55 rotates under the drive of the third driving device 52. Whenever the window 551 turns below the third inlet 512, the material entering the dividing cavity 511 can fall into the opening at the top of the sample retention channel 53 through the window 551. And it can be imported into the sample retention barrel 7 through the sample retention channel 53 to complete a sample cutting process. When the window 551 turns to no overlap with the third inlet 512, the material falls into the upper surface of the dividing part 55 and falls into the discharge port 513 through the gap between the inner wall of the dividing part 55 and the dividing cavity 511. Then the material is discharged by the discharging channel 54 through the opening at the top of the discharging channel 54.

The fixed constant mass dividing machine 5 also includes a third blowing device. The third blowing device is installed on the box 51 and connected with the external high pressure gas source through a pipeline, which is arranged to blow the air into the dividing cavity 511. Through the third blowing device, the residual material in the dividing cavity 511 and on the surface of the dividing part 55 can be blown clean, which can avoid the mixing of different batches of material, effectively improve the working environment, reduce the labor load of operators and improve the operation efficiency. The solenoid valve or manual valve can also be set on the pipeline connected with the external high pressure gas source, so that the automatic control or manual control of the third blowing device can be realized.

As shown in FIG. 4, the third driving device 52 includes a fifth electric motor 521 and a first transmission component 522 connected to the output shaft of the fifth electric motor 521. The first transmission component 522 is connected to the dividing part 55. The fifth electric motor 521 drives the dividing part 55 rotation through the first transmission component 522. The first transmission component 522 can be a belt, a chain or a gear transmission component. In the embodiment, the first transmission component 522 is a gear transmission component.

Figure 5:
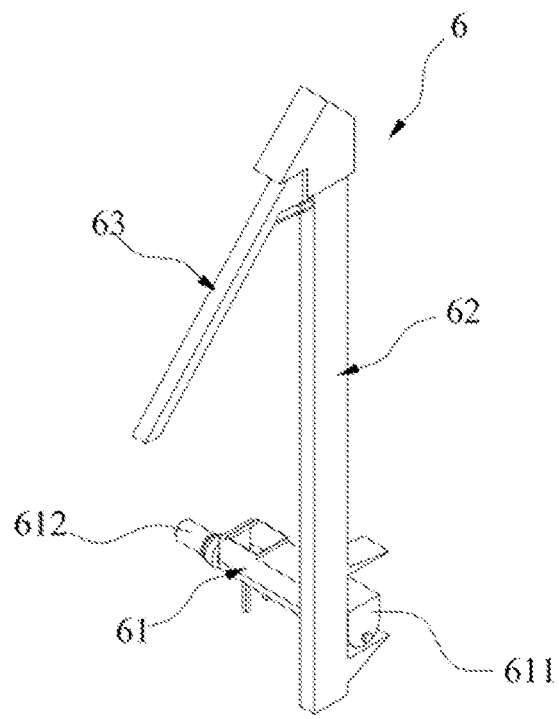
FIG. 5 is the structural diagram of the discharging mechanism in the non-belt automatic mechanized sampling system for the truck in the embodiment of the application.

As shown in FIG. 5 and FIG. 4, in the embodiment, the discharging mechanism 6 includes a horizontal transmission agency 61, a multi bucket elevator 62 and a rotary discharger 63. An inlet is arranged on the horizontal transmission agency 61, and the discharging channel 54 is connected with the inlet through a pipeline. The horizontal transmission agency 61 can transport the material to the multi bucket elevator 62. The multi bucket elevator 62 can transport the discards to the rotary discharger 63 and the rotary discharger 63 can transport the material to the dump storage place.

In the embodiment, the horizontal transmission agency 61 includes an outer shell 611. A channel is set in the outer shell 611 and a screw is set in the channel. One end of the screw is connected with a sixth electric motor 612 and the sixth electric motor 612 drives the screw to rotate. A horizontal transmission agency 61 is provided with an inlet which is located at the first end of the channel and connected with the channel. After the discards enter from the inlet to the channel, the screw rotates and pushes the discards to the second end of the channel under the drive of the sixth electric motor 612. The outer shell 611 is provided with an outlet which is located at the bottom of the second end of the channel.

Figure 15:
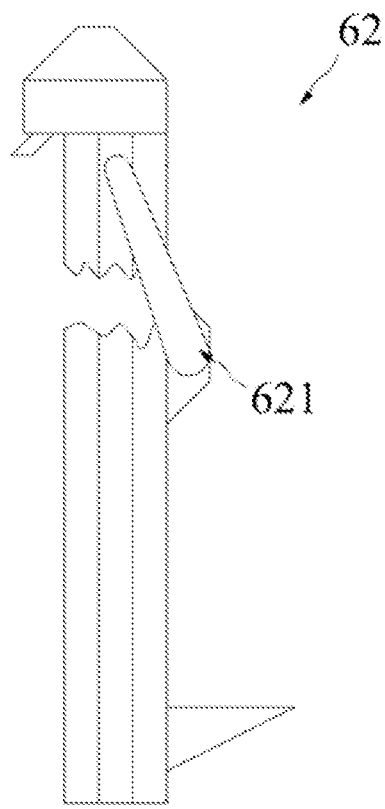
FIG. 15 is the structural diagram of the multi bucket elevator in the non-belt automatic mechanized sampling system for the truck in the embodiment of the application.

The multi bucket elevator 62 includes a fourth driving device and a lifting bucket. The fourth driving device includes a fourth active wheel and a third driven wheel arranged along the vertical direction. The fourth active wheel and the third driven wheel are connected through a chain, and the fourth active wheel is connected with the seventh electric motor. The chain is fixedly connected with the lifting bucket so that the chain can drive the lifting bucket up and down in the vertical direction. In the embodiment, the chain is pivoted with the lifting bucket, when the lifting bucket passes through the highest point, it can rotate relative to the chain and unload the material. The number of lifting buckets in this embodiment is multiple. In the embodiment, as shown in FIG. 15, the multi bucket elevator 62 also includes a cover 621. The cover 621 sets the fourth driving device and the lifting bucket cover inside and the cover 621 is provided with a chute. The chute is located directly below the outlet on the outer shell 611 and located between the fourth active wheel and the third driven wheel. The lifting bucket can be located under the chute, so that the discards can enter into the lifting bucket through the chute.

In the embodiment, the multi bucket elevator 62 also includes a transfer groove which is located on both sides of the fourth active wheel. The chute on the cover 621 is located on both sides of the third driven wheel. The transfer groove is close to the top of the fourth driving device. When the bucket passes through the highest point, the bucket turns over and the material in the bucket can be poured into the transfer groove.

Figure 16:
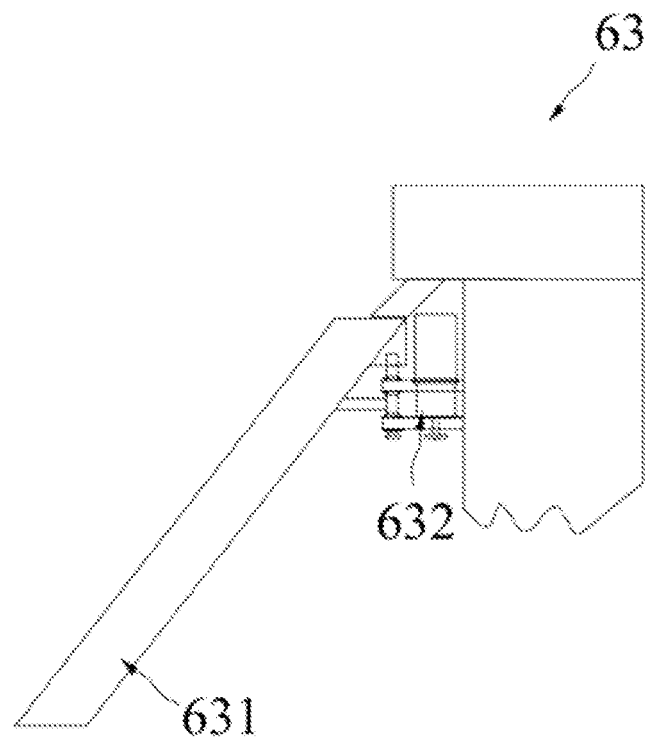
FIG. 16 is the structural diagram of the rotary discharger in the non-belt automatic mechanized sampling system for the truck in the embodiment of the application.

As shown in FIG. 16, the rotary discharger 63 includes a rotary chute 631 and a fifth driving device 632. The fifth driving device 632 is rotationally connected with the rotary chute 631. The fifth driving device 632 can drive the rotary chute 631 to rotate relative to the cover 621. The top of the rotary chute 631 is provided with a first opening that is located below the transfer groove. The bottom of the transfer groove is provided with a second opening. The first opening is larger than the second opening so that the transfer groove can transport the discards to the rotary chute 631.

The fifth driving device includes an eighth electric motor, a fifth active wheel mounted on the eighth electric motor and a fourth driven wheel mounted on the rotary chute 631. The fifth driving wheel and the fourth driven wheel are connected by a chain or a belt. The eighth electric motor is mounted on the cover 621, so that the rotary chute 631 can be driven by the eighth electric motor. The axis of the first opening at the top of the rotary chute 631 coincides with the axis of the rotary chute 631. Thus, it can ensure that during the rotation of rotary chute 631, the discards can flow into the rotary chute 631 through the transfer groove.

In the embodiment, the discards storage place is the carriage 13. In other embodiments, it may also be other locations away from the carriage 13. By rotating the rotary chute 631, the discards can be discharged into other carriage other than the carriage 13.

The discards after dividing of the constant mass dividing machine 5 is transported to the carriage 13 by the discharging mechanism 6, which can replace the manual timing treatment of the discards and improve the operation efficiency.

Figure 17:
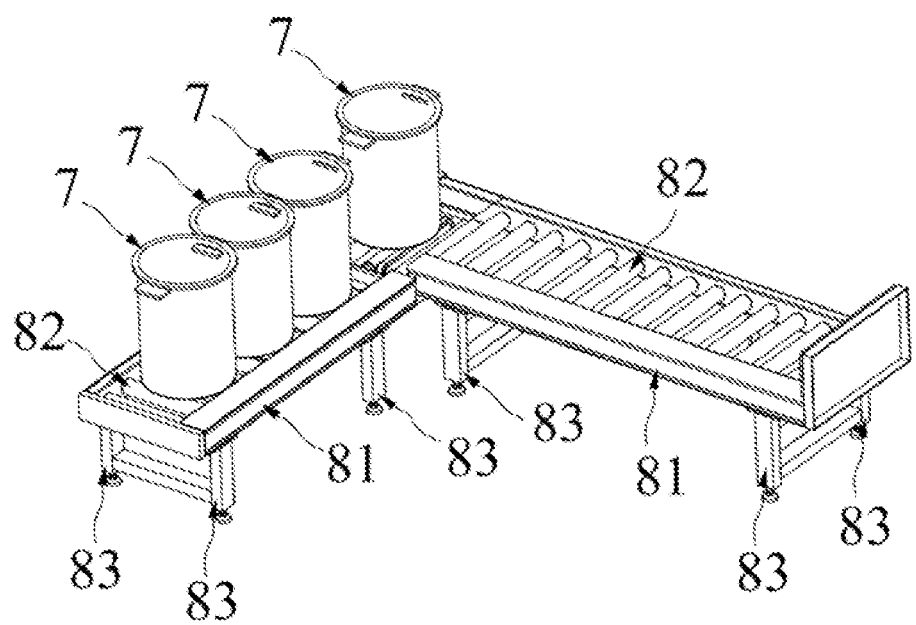
FIG. 17 is the structural diagram of the automatic filling mechanism in the non-belt automatic mechanized sampling system for the truck in the embodiment of the application.
Figure 18:
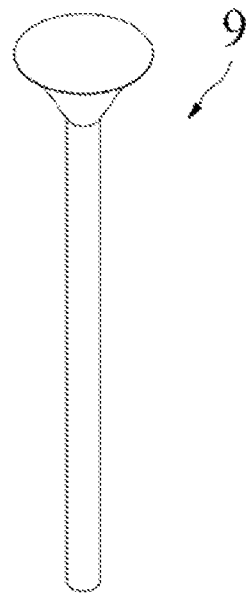
FIG. 18 is the structural diagram of the spare chute in the non-belt automatic mechanized sampling system for the truck in the embodiment of the application.

As shown in FIG. 17, the non-belt automatic mechanized sampling system for truck also includes an automatic filling mechanism. The automatic filling mechanism includes a turntable 81, a rotary driving device 82 and a lifting mechanism 83. A plurality of filling positions are arranged on the turntable 81 along the circumferential direction, and the filling position is set to place the sample retention barrel 7. The rotary driving device 82 is set to drive the turntable 81 to rotate. One of the filling positions is located directly below the sample retention channel 53 in the turntable 81 rotation process. That is, in the turntable 81 rotation process, there is always a filling position can be located directly below the sample retention channel 53, so that the sample retention barrel 7 can be filled through the sample retention channel 53. The lifting mechanism 83 is installed on the turntable 81, and the number of lifting mechanism 83 is equal to the number of filling position. And the lifting mechanism 83 and filling position are set one by one. The lifting mechanism 83 can drive the sample retention barrel 7 to rise and fall in the vertical direction. As shown in FIG. 4, the sample retention channel 53 is arranged in a non-zero angle with the vertical direction, so as to facilitate the preset space between the sample and the discards, avoid interference with each other. And along the extension direction of the sample retention channel 53, the pore size of the sample retention channel 53 is consistent. In other embodiments, the lower end of the sample retention channel 53 is bell-shaped. The top caliber of the sample retention barrel 7 is smaller than that of the bottom end of the sample retention channel 53. The edge of the top opening of the sample retention barrel 7 can fit with the inner surface of the sample retention channel 53 to ensure that the material will not leak to the outside of the sample retention barrel 7 during filling, in which the upper and lower directions refer to the upper and lower directions in FIG. 4.

In the embodiment, the rotary driving device 82 is an electric motor or a hydraulic motor. The lifting mechanism 83 can be a cylinder or an electric push rod. By setting the automatic filling mechanism, the automatic filling of multiple sample retention barrel 7 can be realized, which can effectively save the working manpower. The sample retention barrel 7 and the sample retention channel 53 are tightly attached to each other which can effectively prevent the loss of material moisture.

In the embodiment, the non-belt automatic mechanized sampling system for truck also includes an automatic capping device. Along the rotation direction of the turntable 81, the automatic capping device and the sample retention channel 53 are respectively located above the two adjacent filling positions. The filling position corresponding to the automatic capping device is located downstream of the filling position corresponding to the sample retention channel 53. By setting the automatic capping device, the automatic operation can be realized, and the sample retention channel 53 can be automatically sealed after filling to avoid moisture loss.

The working principle of the non-belt automatic mechanized sampling system for truck is as follows:

The controller of the non-belt automatic mechanized sampling system for truck acquires the truck information from the upper terminal to the truck carriage 13 under the working platform 1. The truck information includes mineral information and acquisition mode.

In the embodiment, the mineral information includes a mineral type, a mineral weight, a mineral batch and the ore source, etc. According to the mineral information, the controller determines the sampling frequency, the single sampling quantity, the sampling times and the backup sampling quantity. The sampling mechanism 2 collects materials according to the sampling frequency, and the weight of materials collected each time is equal to the single sampling amount. In the process of collecting materials by the sampling mechanism 2, the controller adjusts the position of the first frame 12 on the working platform 1 through the first horizontal driving mechanism 15, and adjusts the position of the sampler 23 on the first frame 12 through the second horizontal driving mechanism 25. By adjusting the sampling depth of the sampler 23 through the vertical driving mechanism 24, the sampling range of the sampler 23 can cover the whole carriage 13. In the range of sampling times, the sampler 23 transports the collected materials to the stock bin 31 of the feeder 3. In the range of backup sampling times, the materials collected by the sampler 23 are manually retained.

If the integrated sample preparation component 100 fails, the material collected by the sampling mechanism 2 can be transported directly to the sample retention barrel 7 through spare chute 9. As shown in FIG. 17, the spare chute 9 is fixed to the working platform 1. When the integrated sample preparation component 100 fails, the sample retention barrel 7 is fixed below the spare chute 9, and then the sampling mechanism 2 is moved to the top of the spare chute 9. Thus, the material collected by the sampler 23 enters the sample retention barrel 7 through the spare chute 9.

There are two collection methods. The first is to collect multiple sub-samples at one time and then the whole sample is sampled through the integrated sample preparation component 100. The second is to sample each sub-sample through the integrated sample preparation component 100. When the first collection method is used, the sampler 23 transports all the collected materials to the stock bin 31. The feeder 3, the crusher 4 and the constant mass dividing machine 5 of the integrated sample preparation component 100 will feed, crush and constant mass divide in turn. The samples under constant mass divided are stored in the sample retention barrel 7. The discards are transported to the storage place through the discharging mechanism 6. When the second method is used, within the sampling times, the sampler 23 transports the collected material to the stock bin 31. The integrated sample preparation component 100 prepares the samples for this time. After the sample preparation, the sampler 23 conveys the next batch of materials to the stock bin 31. During the processing of two adjacent batches of materials by the integrated sample preparation component 100, the first blowing device cleans the materials left on the inner wall of the cavity 35 and the surface of the discharge channel 34. The second blowing device is used to blow the residual materials in the inner wall of the crushing chamber 413 and the surface of the crushing mechanism 43, and the third blowing device is used to blow the residual materials in the dividing cavity 511 and the surface of the dividing part 55.

The working principle of the integrated sample preparation component 100 is as follows:

At the beginning of sample preparation, the constant mass dividing machine 5, the crusher 4 and the feeder 3 are started in turn. And the first blowing device, the second blowing device and the third blowing device are opened in turn after the sample preparation is completed.

After the feeder 3 starts, the first rotating bearing 32 drives the feeding component 35 to rotate, and the feeding component 35 scrapes the material to the first outlet 3121. The material flows evenly from the first outlet 3121 through the discharge channel 34 to the crushing chamber 413.

The second rotating bearing 42 drives the crushing mechanism 43 to rotate and crush the material through the hammer 432 on the crushing mechanism 43 and the inner wall of the crushing chamber 413. The crushed material flows directly from the second outlet 412 to the constant mass dividing machine 5 without passing through the sieve plate. The divided sample flows into the sample retention barrel 7 through the sample retention channel 53 and remains. The divided discards flows into the discharging mechanism 6 through the discharging channel 54 and transported to the storage place through the discharging mechanism 6.

In the embodiment, the divide coefficient and the opening of the window 551 can be calculated according to the total mass of the crushed material and the mass of the required sample. The sample with the required mass can be divided by controlling the opening of the window 551. For the same batch of materials with different quality, it can meet the requirements that the materials with different quality are cut with the same numbers, so as to make the sample representative. The utility model has the advantages of simple design structure, uniform division, adjustable cutting speed, good stability of division ratio, and it can ensure the uniformity and representativeness of division.

The non-belt automatic mechanized sampling system for truck adopts non-belt, sampling and preparation integrated design scheme, which can effectively solve the problems of coal leakage, sticking, blocking and residual mixture in the sampling and sample preparation process of the automatic mechanized sampling system for truck in related technology. It can reduce the water loss of coal sample and ensure the precision and bias of the whole sampling system meets the requirements of the national standard. It can complete the work of feeding, crushing, dividing and retaining samples from top to bottom at one time after collecting all sub samples in the sampling mechanism, and it can also continuously crush and reduce single sub sample in the sampling mechanism.

What is claimed is:
1. A non-belt automatic mechanized sampling system for a truck, comprising:
a working platform comprising a transport channel and a slide rail extending along a first direction, wherein the transport channel is arranged below the slide rail and is configured to enable the truck to pass through;

a first frame arranged to slide fit with the slide rail;

a first horizontal driving mechanism connected with the first frame and configured to drive the first frame to slide along the first direction;

a sampling mechanism configured to slide along a second direction relative to the first frame, wherein the sampling mechanism is also configured to collect materials from a carriage of the truck, the first direction is perpendicular to the second direction, and the first direction and the second direction are horizontally arranged; and an integrated sample preparation component comprising a discharging mechanism and a feeder, a crusher, a constant mass dividing machine and a sample retention barrel arranged from top to bottom, wherein the feeder is configured to convey the material to the crusher, and the crusher is configured to crush the material and convey the crushed material to the constant mass dividing machine, the constant mass dividing machine is configured to divide the crushed material into samples and discards, then convey the samples to the sample retention barrel and discard to the discharging mechanism, and the discharging mechanism is configured to convey the discards to the carriage.

2. The non-belt automatic mechanized sampling system for the truck according to claim 1, wherein the sampling mechanism comprises:

a second frame slidably arranged on the first frame;

a walking wheel drivingly arranged on the second frame and slidably arranged on the first frame;

a sampler slidably arranged on the second frame;

a second horizontal driving mechanism arranged to drive the second frame to slide relative to the first frame; and a vertical driving mechanism arranged to drive the sampler to move in a vertical direction.

3. The non-belt automatic mechanized sampling system for the truck according to claim 2, wherein the sampler comprises:

a barrel slidably arranged on the second frame, wherein the vertical driving mechanism is drivingly connected with the barrel;

a rotary drive fixedly connected with the barrel;

a sampling head installed at one end of the barrel, wherein the sampling head is conical; and a screw penetrated into the barrel, wherein one end of the screw is adjacent to the sampling head, and the rotary drive is rotationally connected with the screw.

4. The non-belt automatic mechanized sampling system for the truck according to claim 1, wherein the feeder comprises a stock bin, a first rotating bearing, a first driving device and a feeding component, wherein an inner part of the stock bin is provided with a cavity, a first end of the cavity is provided with a first inlet, a second end of the cavity is provided with a first outlet, and the sampling mechanism is arranged to convey the material to the stock bin;

the first rotating bearing is threaded through the first outlet;

a first end of the feeding component is fixedly connected with the first rotating bearing, a second end of the feeding component is fitted with an inner wall of the stock bin, the feeding component is configured to enable the material to flow out from the first outlet when the first driving device drives the first rotating bearing to drive the feeding component to rotate; and the first outlet is connected with the crusher.

5. The non-belt automatic mechanized sampling system for the truck according to claim 4, wherein the crusher comprises:

a shell internally provided with a crushing chamber, wherein an upper end of the crushing chamber is provided with a second inlet, and a lower end of the crushing chamber is provided with a second outlet;

a first chute, wherein the second inlet is connected with the first outlet through the first chute;

at least two crushing mechanisms arranged at intervals along the vertical direction to crush materials, wherein a gap between each of the at least two crushing mechanisms and an inner wall of the crushing chamber is adjustable; and a second driving device configured to drive the crushing mechanism to rotate.

6. The non-belt automatic mechanized sampling system for the truck according to claim 5, wherein the crusher further comprises a second rotating bearing drivingly arranged in the shell, the second driving device is configured to drive the second rotating bearing to rotate, each of the at least two crushing mechanisms comprises a hammer plate fixedly mounted on the second rotating bearing and a plurality of hammers uniformly distributed on the hammer plate, and the hammer is configured to crush the material.

7. The non-belt automatic mechanized sampling system for the truck according to claim 6, wherein the constant mass dividing machine comprises:

a box provided with a dividing cavity, wherein a top of the dividing cavity is provided with a third inlet and a bottom of the driving cavity is provided with a discharge port, and the third inlet is connected with the crusher;

a third driving device installed on the box;

a dividing part located in the dividing cavity, wherein a gap is arranged between the dividing part and an inner wall of the dividing cavity, a window is arranged on the dividing part, and the window is arranged to have a first position completely overlapped with the third inlet and a second position completely not overlapped with the third inlet in the vertical direction, and the third driving device is configured to drive the dividing part to rotate between the first position and the second position; and a sample retention channel located directly below the third inlet and below the window, wherein the sample retention channel is connected with the sample retention barrel.

8. The non-belt automatic mechanized sampling system for the truck according to claim 7, wherein the constant mass dividing machine further comprises a discharging channel, wherein a top of the discarding channel is connected with the discharge port, a bottom of the discharge port is connected with the discharging mechanism, and the sample retention channel is threaded through the discarding channel.

9. The non-belt automatic mechanized sampling system for the truck according to claim 7, further comprising an automatic filling mechanism, wherein the automatic filling mechanism comprises:

a turntable provided with a plurality of filling positions evenly distributed on the turntable along a circumference of the turntable, wherein the plurality of filling positions are configured to place the sample retention barrel;

a rotary driving device configured to drive the turntable to rotate, so that one of the plurality of filling positions is directly below the sample retention channel; and a plurality of lifting mechanism installed on the turntable and located below the plurality of filling positions, wherein the plurality of lifting mechanism is in one-to-one correspondence to the plurality of filling positions, the plurality of lifting mechanisms are configured to drive the sample retention barrel to rise and fall in the vertical direction, a bottom of the sample retention channel is bell shaped and a top of the sample retention channel is provided with an opening, and an edge of the opening fits with an inner surface of the sample retention channel.

10. The non-belt automatic mechanized sampling system for the truck according to claim 8, wherein the discharging mechanism comprises a pipeline, a horizontal transmission agency, a multi bucket elevator and a rotary discharger,
the horizontal transmission agency comprises an inlet, and the discharging channel is connected with the inlet through the pipeline; and
the horizontal transmission agency is configured to transport the material to the multi bucket elevator, the multi bucket elevator is configured to transport the discards to the rotary discharger, and the rotary discharger is configured to transport the discards to the carriage.

* * * * *